United States Patent
Ibarra Covarrubias

(10) Patent No.: US 10,859,526 B2
(45) Date of Patent: Dec. 8, 2020

(54) GAS SENSOR WITH A PUMP CELL

(71) Applicant: DELPHI TECHNOLOGIES IP LIMITED, St. Michael (BB)

(72) Inventor: Alfredo Ibarra Covarrubias, Oxford, MI (US)

(73) Assignee: DELPHI TECHNOLOGIES IP LIMITED

( * ) Notice: Subject to any disclaimer, the term of this patent is extended or adjusted under 35 U.S.C. 154(b) by 116 days.

(21) Appl. No.: 15/821,079

(22) Filed: Nov. 22, 2017

(65) Prior Publication Data

US 2019/0154626 A1 May 23, 2019

(51) Int. Cl.
*G01N 27/407* (2006.01)
*G01N 27/30* (2006.01)
*G01N 27/406* (2006.01)
*G01N 27/41* (2006.01)

(52) U.S. Cl.
CPC ....... *G01N 27/4073* (2013.01); *G01N 27/301* (2013.01); *G01N 27/4065* (2013.01); *G01N 27/4077* (2013.01); *G01N 27/41* (2013.01)

(58) Field of Classification Search
CPC ............. G01N 27/407; G01N 27/4073; G01N 27/4075; G01N 27/4076; G01N 27/4077; G01N 27/301; G01N 27/406; G01N 27/4062; G01N 27/4065; G01N 27/4067; G01N 27/41

See application file for complete search history.

(56) References Cited

U.S. PATENT DOCUMENTS

| | | | | |
|---|---|---|---|---|
| 4,579,643 A | * | 4/1986 | Mase | G01N 27/417 204/424 |
| 4,755,274 A | * | 7/1988 | Mase | G01N 27/417 204/412 |
| 4,784,743 A | * | 11/1988 | Iino | G01N 27/4065 204/425 |
| 4,798,693 A | * | 1/1989 | Mase | G01N 27/4071 204/425 |
| 5,028,309 A | * | 7/1991 | Nishizawa | G01N 27/4065 204/408 |

(Continued)

FOREIGN PATENT DOCUMENTS

JP 61134656 A 6/1986

*Primary Examiner* — James Lin
*Assistant Examiner* — Vivian A Tran
(74) *Attorney, Agent, or Firm* — Joshua M. Haines

(57) ABSTRACT

A gas sensor includes an electrochemical cell having a solid electrolyte layer disposed between a sensing electrode and a reference electrode; a heater disposed in thermal communication with the electrochemical cell, the heater having a positive heater lead and a negative heater lead; a reference gas channel; a reference chamber in fluid communication with the reference electrode; a pump cell having a first pump cell electrode in fluid communication with the reference gas channel and also having a second pump cell electrode in fluid communication with the reference chamber. The first pump cell electrode has a pump cell first lead which forms a first electrical junction with either the positive heater lead and the negative heater lead and the second pump cell electrode has a pump cell second lead which forms a second electrical junction with the same heater lead as the pump cell first lead.

9 Claims, 2 Drawing Sheets

(56) References Cited

U.S. PATENT DOCUMENTS

| | | | | |
|---|---|---|---|---|
| 5,169,513 | A | * 12/1992 | Mase | B32B 18/00 |
| | | | | 204/412 |
| 6,156,176 | A | 12/2000 | Sugiyama et al. | |
| 6,723,217 | B1 | * 4/2004 | Duce | G01N 27/4071 |
| | | | | 156/60 |
| 2002/0108855 | A1 | * 8/2002 | Wang | G01N 27/419 |
| | | | | 204/425 |
| 2002/0108871 | A1 | * 8/2002 | Wang | G01N 27/419 |
| | | | | 205/784 |
| 2003/0183520 | A1 | * 10/2003 | Mabuchi | G01N 27/419 |
| | | | | 204/424 |
| 2011/0314898 | A1 | 12/2011 | Liemersdorf et al. | |
| 2012/0006692 | A1 | 1/2012 | Liemersdorf et al. | |

* cited by examiner

GAS SENSOR WITH A PUMP CELL

TECHNICAL FIELD OF INVENTION

The present invention relates to a gas sensor, and more particularly to a gas sensor with a pump cell.

BACKGROUND OF INVENTION

The automotive industry has used exhaust gas sensors in automotive vehicles for many years to sense the composition of exhaust gases, namely, oxygen. For example, a sensor is used to determine the exhaust gas content for alteration and optimization of the air to fuel ratio for combustion.

One type of sensor uses an ionically conductive solid electrolyte between porous electrodes. For oxygen, solid electrolyte sensors are used to measure oxygen activity differences between an unknown gas sample and a known gas sample. In the use of a sensor for automotive exhaust, the unknown gas is exhaust and the known gas, i.e. reference gas, is usually atmospheric air because the oxygen content in air is relatively constant and readily accessible. This type of sensor is based on an electrochemical galvanic cell operating in a potentiometric mode to detect the relative amounts of oxygen present in an automobile engine's exhaust. When opposite surfaces of this galvanic cell are exposed to different oxygen partial pressures, an electromotive force ("emf") is developed between the electrodes according to the Nernst equation.

With the Nernst principle, chemical energy is converted into an electromotive force. A gas sensor based upon this principle typically consists of an ionically conductive solid electrolyte material, a porous electrode with a porous protective overcoat exposed to exhaust gases ("exhaust gas electrode"), and a porous electrode exposed to a known gas' partial pressure ("reference electrode"). Sensors typically used in automotive applications use a yttria stabilized zirconia based electrochemical galvanic cell with porous platinum electrodes, operating in potentiometric mode, to detect the relative amounts of a particular gas, such as oxygen for example, that is present in an automobile engine's exhaust. Also, a typical sensor has a ceramic heater attached to help maintain the sensor's ionic conductivity. When opposite surfaces of the galvanic cell are exposed to different oxygen partial pressures, an electromotive force is developed between the electrodes on the opposite surfaces of the zirconia wall, according to the Nernst equation:

$$E = \left(\frac{-RT}{4F}\right)\ln\left(\frac{P^{ref}_{O_2}}{P_{O_2}}\right)$$

where:
E=electromotive force;
R=universal gas constant;
F=Faraday constant; and
T=absolute temperature of the gas.

Due to the large difference in oxygen partial pressure between fuel rich and fuel lean exhaust conditions, the electromotive force (emf) changes sharply at the stoichiometric point, giving rise to the characteristic switching behavior of these sensors. Consequently, these potentiometric oxygen sensors indicate qualitatively whether the engine is operating fuel-rich or fuel-lean, conditions without quantifying the actual air-to-fuel ratio of the exhaust mixture.

For example, an oxygen sensor, with a solid oxide electrolyte such as zirconia, measures the oxygen activity difference between an unknown gas and a known reference gas. Usually, the known reference gas is the atmosphere air while the unknown gas contains the oxygen with its equilibrium level to be determined. Typically, the sensor has a built-in reference gas channel which connects the reference electrode to the ambient air. To avoid contamination of the reference air by the unknown gas, the sensor requires an expensive sensor package that usually has complex features in order to provide sufficient gas sealing between the reference air and the unknown gas. Historically, these gas sealed sensor packages have demonstrated insufficient durability in the field. This problem can be avoided by using in-situ electrochemical oxygen pumping. In this method, the air reference electrode chamber is replaced by a sealed reference electrode with oxygen electrochemically pumped in from the exhaust gas. This method eliminates the exhaust gas contamination problem but creates its own drawbacks. That is, an expensive electronic circuit is required to do the electrochemical oxygen pumping. U.S. Pat. No. 6,723,217 to Duce et al. and U.S. Pat. No. 6,156,176 to Sugiyama et al. disclose gas sensors which include a pump cell, however, improvements in any art are always desired.

What is needed in the art is a simplified gas sensor that employs a pump cell.

SUMMARY OF THE INVENTION

Briefly described, a gas sensor in accordance with the present invention includes an electrochemical cell having a solid electrolyte layer disposed between a sensing electrode and a reference electrode; a heater disposed in thermal communication with the electrochemical cell, the heater having a positive heater lead and a negative heater lead; a reference gas channel; a reference chamber in fluid communication with the reference electrode; a pump cell having a first pump cell electrode in fluid communication with the reference gas channel and also having a second pump cell electrode in fluid communication with the reference chamber, wherein the first pump cell electrode has a pump cell first lead which forms a first electrical junction with one of the positive heater lead and the negative heater lead and wherein the second pump cell electrode has a pump cell second lead which forms a second electrical junction with the same heater lead as the pump cell first lead.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
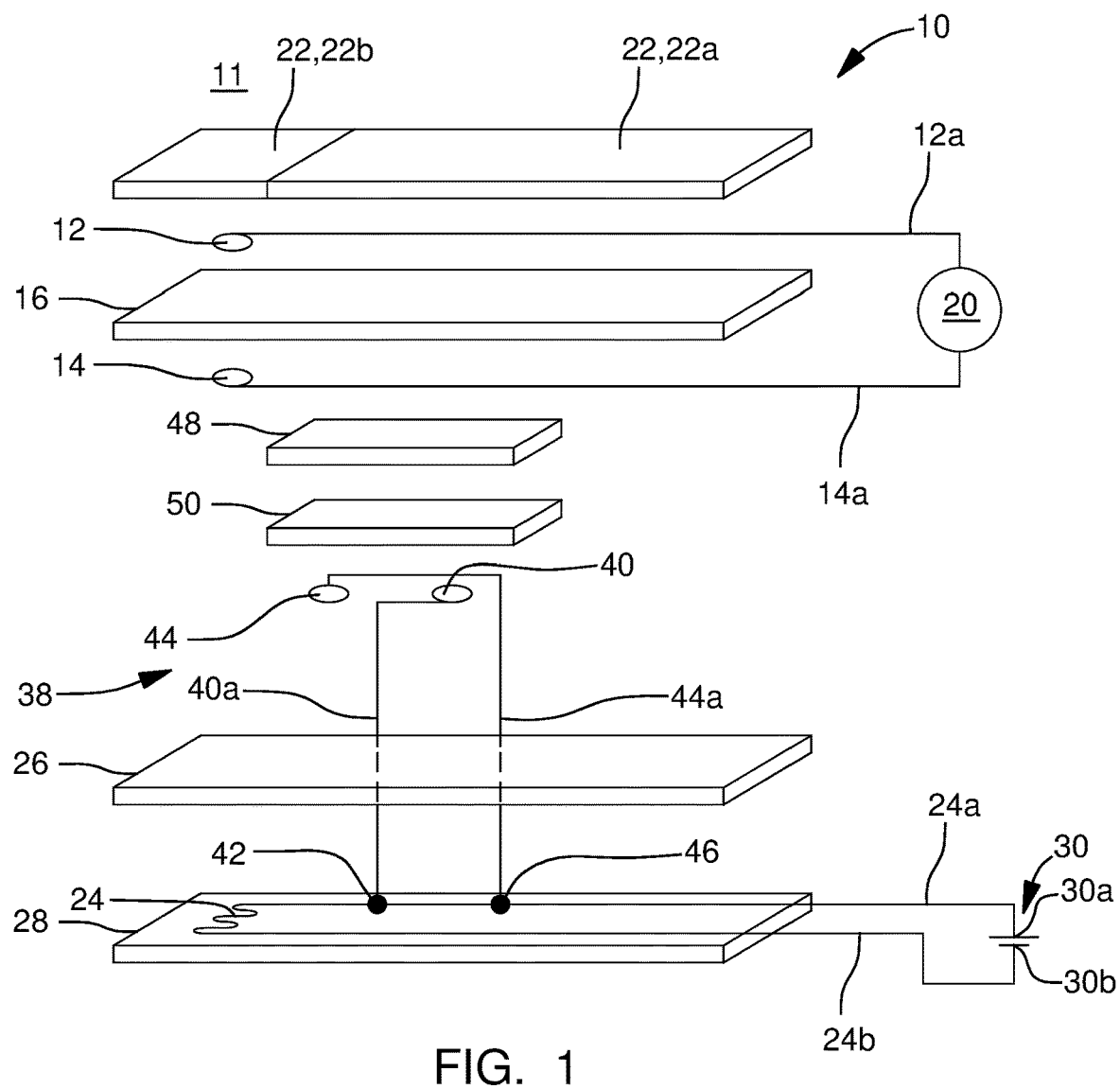
FIG. 1 is an exploded isometric schematic view of a gas sensor in accordance with the present invention.
Figure 2:
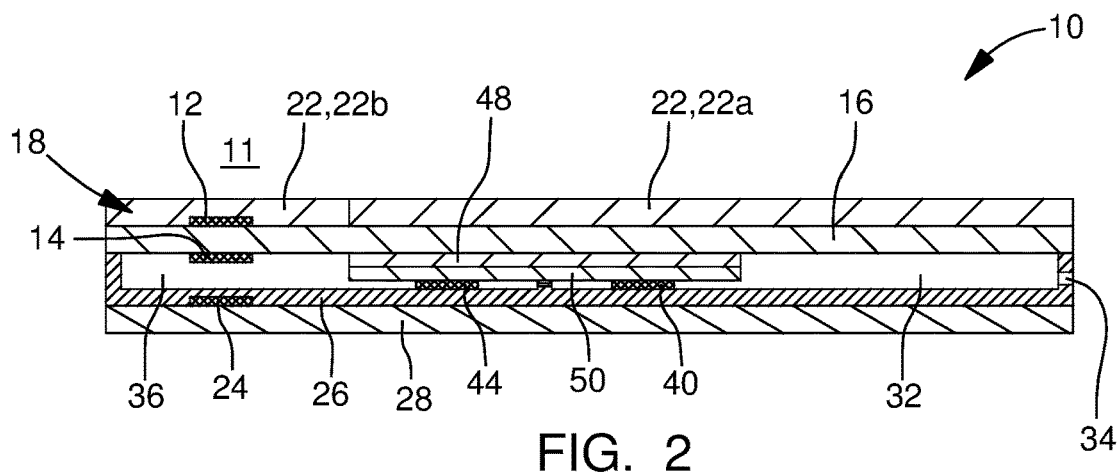
FIG. 2 is a cross-sectional schematic view of the gas sensor of FIG. 1.

A gas sensor 10 in accordance with the present invention is shown with reference to FIG. 1 and FIG. 2 which are an exploded isometric schematic view and a cross-sectional schematic view respectively of gas sensor 10. Gas sensor 10 may be, by way of non-limiting example only, a gas sensor which senses concentrations of exhaust gas species in an exhaust stream 11 of an internal combustion engine (not shown), and more specifically, may sense the concentration of oxygen in the exhaust stream. Gas sensor 10 includes a sensing electrode 12 and a reference electrode 14 such that a first solid electrolyte layer 16 is disposed between sensing electrode 12 and reference electrode 14 and such that reference electrode 14 is in contact with one side of first solid electrolyte layer 16 while reference electrode 14 is disposed in contact with another side of first solid electrolyte layer 16 that is opposed to the first side of first solid electrolyte layer 16 with which reference electrode 14 is in contact. Sensing electrode 12, reference electrode 14, and first solid electrolyte layer 16 together define an electrochemical cell 18. Sensing electrode 12 includes a sensing electrode lead 12a which is in electrical communication with sensing electrode 12 and which is a first input to a volt meter 20 (shown only in FIG. 1) while reference electrode 14 similarly includes a reference electrode lead 14a which is in electrical communication with reference electrode 14 and which is a second input to volt meter 20.

Gas sensor 10 also includes a first protective insulating layer 22 on the side of sensing electrode 12 that is opposite first solid electrolyte layer 16. First protective insulating layer 22 includes a dense section 22a and a porous section 22b such that porous section 22b enables fluid communication between sensing electrode 12 and exhaust stream 11, thereby allowing sensing electrode 12 to be exposed to exhaust stream 11.

Gas sensor 10 also includes a heater 24 disposed in thermal communication with electrochemical cell 18 so as to maintain electrochemical cell 18 at a desired operating temperature, which may be, by way of non-limiting example only, in the range of about 600° C. to about 800° C. Heater 24 is disposed between, and in contact with a second protective insulating layer 26 and a third protective insulating layer 28 such that second protective insulating layer 26 is on the side of heater 24 that faces toward reference electrode 14 and such that third protective insulating layer 28 is on the side of heater 24 that faces away from reference electrode 14. Heater 24 includes a positive heater lead 24a which is in electrical communication with heater 24 and which is electrically connected to a positive terminal 30a of a power source 30 and also includes a negative heater lead 24b which is in electrical communication with heater 24 and which is electrically connected to a negative terminal 30b of power source 30. Heater 24 may comprise, by way of non-limiting example only, platinum, alumina, palladium, and the like, as well as mixtures and alloys comprising at least one of the foregoing metals or any other conventional heater. Heater 24 may be formed, by way of non-limiting example only, by screen printing the material onto third protective insulating layer 28 to a thickness of about 5 microns to about 50 microns where positive heater lead 24a and negative heater lead 24b may be formed simultaneously with heater 24.

A reference gas channel 32 is defined between first solid electrolyte layer 16 and second protective insulating layer 26 such that reference gas channel 32 receives a reference gas through a reference gas port 34, which may be formed, by non-limiting example only, through second protective insulating layer 26. Furthermore, reference gas channel 32 is defined in part by first solid electrolyte layer 16 and second protective insulating layer 26. The reference gas may be, by way of non-limiting example only, atmospheric air or the exhaust gases of exhaust stream 11. As used herein, atmospheric air is the air found in Earth's atmosphere which has an understood substantially constant concentration of about 21% oxygen.

A reference chamber 36 is defined between first solid electrolyte layer 16 and second protective insulating layer 26 such that reference chamber 36 is in fluid communication with reference electrode 14. Furthermore, reference chamber 36 is defined in part by first solid electrolyte layer 16 and second protective insulating layer 26. Reference chamber 36 receives oxygen that is pumped from reference gas channel 32 as will be described in greater detail later.

A pump cell 38 is provided between first solid electrolyte layer 16 and second protective insulating layer 26 such that pump cell 38 is also between reference gas channel 32 and reference chamber 36. It should be noted that pump cell 38 serves to in part define reference gas channel 32 and reference chamber 36. Pump cell 38 includes a first pump cell electrode 40 disposed in fluid communication with reference gas channel 32 such that first pump cell electrode 40 includes a pump cell first lead 40a which is in electrical communication with first pump cell electrode 40 and which forms a first electrical junction 42 with either positive heater lead 24a or negative heater lead 24b where FIG. 1 shows first electrical junction 42 being formed with positive heater lead 24a. Pump cell 38 also includes a second pump cell electrode 44 disposed in fluid communication with reference chamber 36 such that second pump cell electrode 44 includes a pump cell second lead 44a which is in electrical communication with second pump cell electrode 44 and which forms a second electrical junction 46 with either positive heater lead 24a or negative heater lead 24b such that second electrical junction 46 is made with the same heater lead 24a, 24b as first electrical junction 42. Since first electrical junction 42 has been illustrated in FIG. 1 as being made with positive heater lead 24a, FIG. 1 also shows second electrical junction 46 being made with positive heater lead 24a. However, it should be emphasized that first electrical junction 42 and second electrical junction 46 may alternatively be made with negative heater lead 24b. As shown in FIG. 1, pump cell first lead 40a and pump cell second lead 44a pass through second protective insulating layer 26 in order to reach positive heater lead 24a. First electrical junction 42 and second electrical junction 46 are spaced from each other along positive heater lead 24a or negative heater lead 24b such that the portion of positive heater lead 24a or negative heater lead 24b that is between first electrical junction 42 and second electrical junction 46 produces a voltage drop of about 0.05 V to about 0.7 V and is preferably about 0.2 V to about 0.4 V between first electrical junction 42 and second electrical junction 46. Using the formula for a voltage divider, we know that:

$$V_{drop} = \frac{V_s \times R_x}{R_{total}}$$

where $V_{drop}$=voltage drop between first electrical junction 42 and second electrical junction 46; $V_s$=power supply voltage, i.e. voltage of power source 30; $R_x$=resistance of the segment of positive heater lead 24a or negative heater lead 24b between first electrical junction 42 and second electrical junction 46; and $R_{total}$=total resistance of positive heater lead 24a, negative heater lead 24b, heater 24, and any wiring connecting positive heater lead 24a and negative heater lead 24b to power source 30. If we consider an example where power source 30 has a nominal value of 13.5 V and $R_{total}=10\Omega$, the resistance of the segment of positive heater lead 24a or negative heater lead 24b between first electrical junction 42 and second electrical junction 46 is about 0.12Ω to about 0.3Ω to achieve the preferred voltage drop of about 0.2 V to about 0.4 V. Pump cell 38 also includes a fourth protective insulating layer 48 and a second solid electrolyte layer 50 such that a first side of fourth protective insulating layer 48 is in contact with first solid electrolyte layer 16 and such that a first side of second solid electrolyte layer 50 is in contact with a second side of fourth protective insulating layer 48 that is opposed to the first side of fourth protective insulating layer 48. In this way, fourth protective insulating layer 48 provides electrical isolation between first solid electrolyte layer 16 and second solid electrolyte layer 50. First pump cell electrode 40 and second pump cell electrode 44 are in contact with a second side of second solid electrolyte layer 50 that is opposed to the first side of second solid electrolyte layer 50 that is in contact with fourth protective insulating layer 48.

First protective insulating layer 22, second protective insulating layer 26, third protective insulating layer 28, and fourth protective insulating layer 48 comprise, by way of non-limiting example only, a dielectric material such as alumina and the like and may be formed using, by way of non-limiting example only, ceramic tape casting methods, plasma spray deposition techniques, screen printing, and stenciling. The thickness of first protective insulating layer 22, second protective insulating layer 26, third protective insulating layer 28, and fourth protective insulating layer 48 may be between about 50 microns and about 200 microns and provide one or more of the following characteristics: protection of various elements of gas sensor 10 from abrasion, vibration, and the like, physical strength to gas sensor 10, physically separation of various elements of gas sensor 10, and providing electrical isolation between various elements of gas sensor 10.

First solid electrolyte layer 16 and second solid electrolyte layer 50 may be made of any material that is capable of permitting the electrochemical transfer of oxygen ions while inhibiting the physical passage of exhaust gases, has an ionic/total conductivity ratio of approximately unity, and is compatible with the environment in which gas sensor 10 will be utilized (e.g. up to about 1,000° C.). Possible materials for first solid electrolyte layer 16 and second solid electrolyte layer 50 can comprise any material conventionally employed as sensor electrolytes which include, by way of non-limiting example only, zirconia which may optionally be stabilized with calcium, barium, yttrium, magnesium, aluminum, lanthanum, cesium, gadolinium, and the like as well as combination comprising at least one of the foregoing. For example, first solid electrolyte layer 16 and second solid electrolyte layer 50 can be aluminum and yttrium stabilized zirconia. First solid electrolyte layer 16 and second solid electrolyte layer 50 may be formed via many conventional processes, e.g. die pressing, roll compaction, stenciling, screen printing, tape casting techniques, and the like, and have a thickness of about 25 microns to about 500 microns.

As should now be readily apparent, the thicknesses of the various layers, channels, and chambers are greatly exaggerated in the figures in order to provide clarity. Furthermore, it should be noted that FIG. 1 does not illustrate reference gas channel 32 and reference chamber 36 which are formed by fugitive material, for example a carbon material such as carbon black, applied during the build-up of the various layers of gas sensor 10 where the fugitive material is subsequently burned out during firing of gas sensor 10.

Sensing electrode 12, reference electrode 14, first pump cell electrode 40, and second pump cell electrode 44 can comprise any catalyst capable of ionizing oxygen, including, but not limited to metals such as platinum, palladium, osmium, rhodium, iridium, gold, and ruthenium; metal oxides such as zirconia, yttria, ceria, calcia, alumina and the like; other materials such as silicon and the like; and mixtures and alloys comprising at least one of the foregoing catalysts. Sensing electrode 12, reference electrode 14, first pump cell electrode 40, and second pump cell electrode 44 can be formed using conventional techniques including sputtering, chemical vapor deposition, or screen printing, among others. If a co-firing process is employed for the formation of gas sensor 10, screen printing the electrodes onto appropriate tapes is preferred due to simplicity, economy, and compatibility with the co-fired process.

Figure 3:
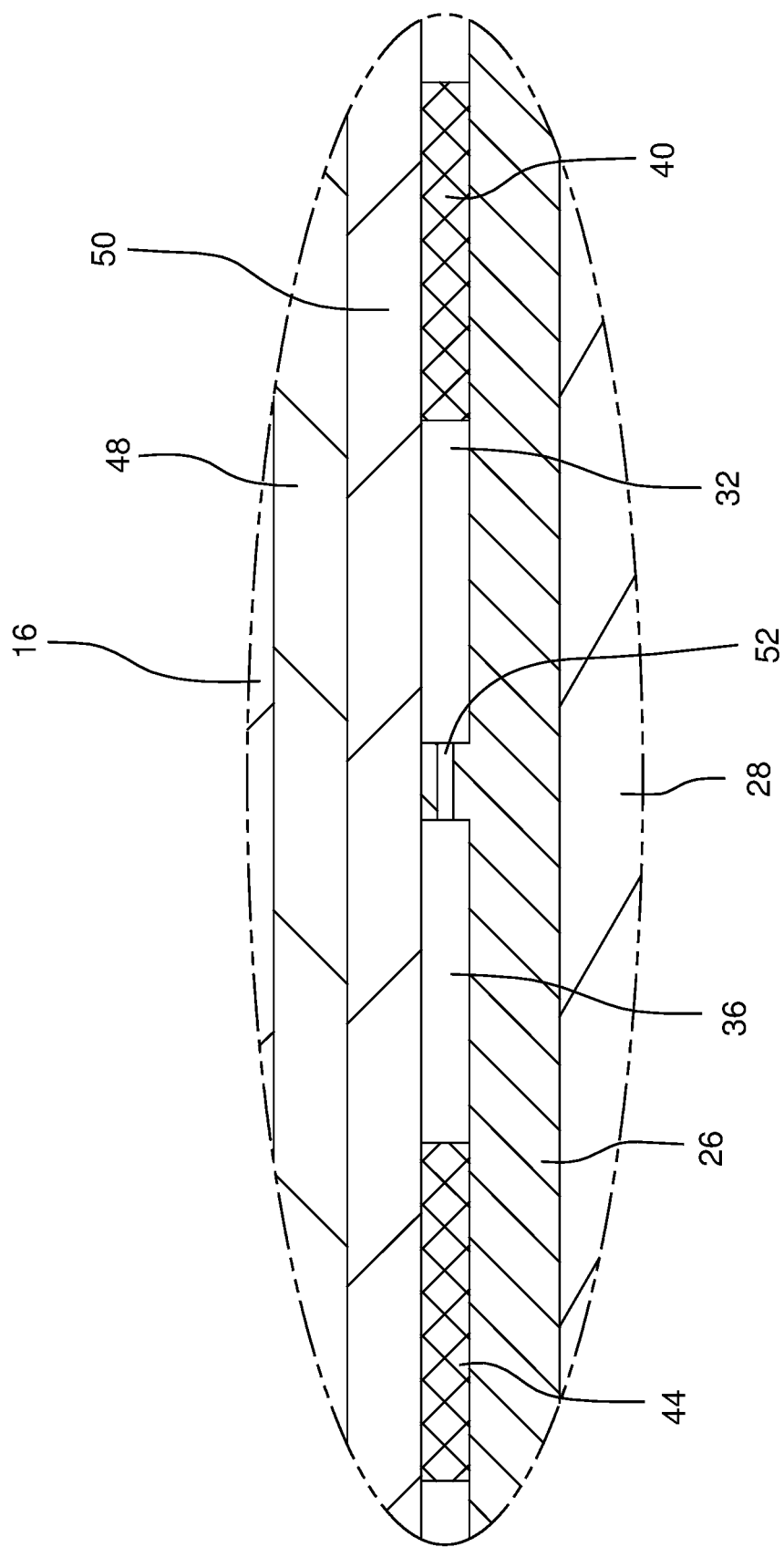
FIG. 3 is an enlarged portion of the cross-sectional schematic view of FIG. 2.

In operation, gas sensor 10 is exposed to a gas to be sensed, which in this non-limiting example, is exhaust stream 11 of an internal combustion engine. Electrical power is supplied to heater 24 from power source 30, for example, at 13.5 V, thereby causing heater 24 to generate heat which is transferred to electrochemical cell 18. A voltage drop occurs between first electrical junction 42 and second electrical junction 46, for example in the range of about 200 mV and 600 mV, thereby causing a voltage difference between first pump cell electrode 40 and second pump cell electrode 44. This voltage difference between first pump cell electrode 40 and second pump cell electrode 44 causes oxygen ions to be pumped, due to electrochemical pumping, through second solid electrolyte layer 50 from reference gas channel 32 to reference chamber 36. Consequently, reference electrode 14 is supplied with oxygen by virtue of fluid communication of reference electrode 14 with reference chamber 36. In order to prevent over-pressurization of reference chamber 36, a pressure bleed passage 52 may be provided which provides a small leak path for oxygen to exit pressure bleed passage 52. As best seen in FIG. 3, pressure bleed passaged 52 may provide fluid communication from reference chamber 36 to reference gas channel 32, however, pressure bleed passage 52 may lead to locations other that reference gas channel 32, for example pressure bleed passage 52 may provide fluid communication from reference chamber 36 back to exhaust stream 11. Also as best seen in FIG. 3, pressure bleed passage 52 may be formed in second protective insulating layer 26, however, it should be understood that pressure bleed passage 52 may alternatively be formed in other layers or combinations of layers any may be dependent upon where pressure bleed passage 52 leads. It should be understood that the reference gas from reference gas channel 32 is not allowed to pass directly to reference chamber 36 through pressure bleed passage 52 due to the pressure resulting from oxygen ions being pumped from reference gas channel 32 to reference chamber 36, i.e. the pressure within reference chamber 36 is greater than the pressure within reference gas channel 32. When electrochemical cell 18 is warmed sufficiently by heat from one or more of heater 24 and exhaust stream 11, for example to a temperature greater than or equal to about 600° C., ionic oxygen is able to flow across first solid electrolyte layer 16, and an electromotive force is generated per the Nernst equation, which varies based on the concentration of oxygen supplied to sensing electrode 12 which is dependent upon the concentration of oxygen in exhaust stream 11. Consequently, volt meter 20 can be used to monitor the voltage between sensing electrode 12 and reference electrode 14 in order to determine the oxygen concentration in exhaust stream 11 which may be useful, by way of non-limiting example only, for controlling and diagnosing the internal combustion engine which produces exhaust stream 11 or for controlling or diagnosing devices which are provided for purifying exhaust stream 11 before it is released to the atmosphere.

Gas sensor 10, which employs pump cell 38 as disclosed herein, provides for simplified circuitry and construction and minimized cost. More specifically, dedicated circuitry is not needed only for the operation of pump cell 38 since pump cell 38 is powered by the same circuitry as heater 24. Furthermore, pump cell 38 is simple to manufacture in comparison to the prior art since first pump cell electrode 40 and second pump cell electrode 44 can be placed on a single layer within gas sensor 10.

While this invention has been described in terms of the preferred embodiments thereof, it is not intended to be so limited, but rather only to the extent set forth in the claims that follow.

I claim:

1. A gas sensor comprising:
   an electrochemical cell having a first solid electrolyte layer disposed between a sensing electrode and a reference electrode;
   a heater disposed in thermal communication with said electrochemical cell, said heater having a positive heater lead and a negative heater lead;
   a reference gas channel;
   a reference chamber in fluid communication with said reference electrode; and
   a pump cell having a first pump cell electrode in fluid communication with said reference gas channel and also having a second pump cell electrode in fluid communication with said reference chamber such that application of a voltage difference between said first pump cell electrode and said second pump cell electrode causes oxygen ions to be pumped from said reference gas channel to said reference chamber, wherein said first pump cell electrode has a pump cell first lead which forms a first electrical junction with one of said positive heater lead and said negative heater lead and wherein said second pump cell electrode has a pump cell second lead which forms a second electrical junction with said one of said positive heater lead and said negative heater lead.

2. The gas sensor as in claim 1, further comprising:
   a protective insulating layer on said first solid electrolyte layer, said protective insulating layer being electrically insulative; and
   a second solid electrolyte layer on said protective insulating layer such that said protective insulating layer is between said first solid electrolyte layer and said second solid electrolyte layer;
   wherein said first pump cell electrode and said second pump cell electrode are disposed on said second solid electrolyte layer such that said second solid electrolyte layer is between said first pump cell electrode and said protective insulating layer and such that said second solid electrolyte layer is between said second pump cell electrode and said protective insulating layer.

3. The gas sensor as in claim 1 further comprising a pressure bleed passage which provides fluid communication out of said reference chamber.

4. The gas sensor as in claim 1 further comprising:
   a first protective insulating layer such that said first protective insulating layer is located between said heater and said electrochemical cell;
   and a pressure bleed passage which provides fluid communication out of said reference chamber.

5. The gas sensor as in claim 4 wherein said pressure bleed passage provides fluid communication from said reference chamber to said reference gas channel.

6. The gas sensor as in claim 4 wherein said pump cell first lead passes through said first protective insulating layer and said pump cell second lead passes through said first protective insulating layer.

7. The gas sensor as in claim 4 further comprising:
   a second protective insulating layer on said first solid electrolyte layer such that said second protective insulating layer is between said first protective insulating layer and said first solid electrolyte layer, said second protective insulating layer being electrically insulative; and
   a second solid electrolyte layer on said second protective insulating layer such that said second protective insulating layer is between said first solid electrolyte layer and said second solid electrolyte layer;
   wherein said first pump cell electrode and said second pump cell electrode are disposed on said second solid electrolyte layer such that said second solid electrolyte layer is between said first pump cell electrode and said second protective insulating layer and such that said second solid electrolyte layer is between said second pump cell electrode and said second protective insulating layer.

8. The gas sensor as in claim 1, further comprising a second solid electrolyte layer, wherein said first pump cell electrode and said second pump cell electrode are disposed on said second solid electrolyte layer such that said second solid electrolyte layer is between said first pump cell electrode and said first solid electrolyte layer and such that said second solid electrolyte layer is between said second pump cell electrode and said first solid electrolyte layer.

9. The gas sensor as in claim 8 further comprising a protective insulating layer on said first solid electrolyte layer, wherein said protective insulating layer is electrically insulative and wherein said protective insulating layer is between said first solid electrolyte layer and said second solid electrolyte layer.

* * * * *